(12) United States Patent
Fischer et al.

(10) Patent No.: US 6,462,518 B1
(45) Date of Patent: Oct. 8, 2002

(54) CONVERTER CIRCUIT HAVING AN INVERTER FOR EACH PHASE

(75) Inventors: Philippe Fischer, Anglikon (CH); John Daniel, Apex, NC (US); Philippe Maibach, Brugg (CH); Madhav Manjrekar, New Berlin, WI (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 09/870,670

(22) Filed: Jun. 1, 2001

(51) Int. Cl.[7] .................................................. G05F 1/70
(52) U.S. Cl. ......................................................... 323/207
(58) Field of Search ................................. 323/205, 207; 363/123, 131; 307/102, 105

(56) References Cited

U.S. PATENT DOCUMENTS 5,329,222 A    7/1994  Gyugyi et al.
5,896,281 A  * 4/1999  Bingley .......................... 363/71
6,154,378 A  * 11/2000 Peterson et al. ............... 363/37

* cited by examiner

*Primary Examiner*—Adolf Deneke Berhane
(74) *Attorney, Agent, or Firm*—Burns, Doane, Swecker & Mathis, L.L.P.

(57) ABSTRACT

A converter circuit is specified for voltage maintenance in an electrical AC supply network (1), with the electrical AC supply network (1) having an associated voltage source (UR; US; UT) for each phase (R; S; T) for supplying an electrical load (2), with the converter circuit having a respective inverter (3) for each phase (R; S; T), which inverter (3) is connected on the DC side via an energy-storage capacitor (4) to a supply device (5). On the AC side, each inverter (3) is connected in series between the associated voltage source (UR; US; UT) and the electrical load (2) in the respective phase (R; S; T), and in that, on the AC side, the supply device (5) is connected to at least two phases (R; S; T) between the associated voltage sources (UR; US; UT) and the respective inverters (3).

13 Claims, 3 Drawing Sheets

CONVERTER CIRCUIT HAVING AN INVERTER FOR EACH PHASE

The present invention was made with government support under Agreement No. N00014-99-3-0002 awarded by the Office of Naval Research. The government has license rights in the invention.

BACKGROUND OF THE INVENTION

1. Field of the Invention

The present invention relates to the field of power electronics. It relates specifically to a converter circuit for voltage maintenance in an electrical AC supply network as claimed in the precharacterizing clause of the independent claim.

2. Background Information

Conventional converter circuits, as are nowadays used in particular to compensate for dips in the network voltage of an electrical single-phase or polyphase AC supply network, in particular to compensate for short-circuits or load changes, are normally connected between the voltage source of one phase of the electrical AC supply network and an electrical load which is supplied by the voltage source. Such a converter circuit is specified, for example, in U.S. Pat. No. 5,329,222. In this document, an energy-storage capacitor is connected on the DC side to an inverter, with the energy-storage capacitor being used as an energy store and supplying the inverter. Furthermore, a supply device is provided, which is connected via an energy-storage capacitor on the DC side to the inverter and is used for supplying, in particular to provide an initial charge for, the energy-storage capacitor. The energy-storage capacitor has a high capacitance in order to allow the inverter to supply sufficient energy to compensate for a voltage dip to the electrical AC supply network, even in the event of a lengthy reduction in the network voltage. According to U.S. Pat. No. 5,329,222, the inverter is connected on the AC side to a secondary of a transformer. The primary of the transformer is connected to one phase of the electrical AC network.

A problem with the converter circuit according to U.S. Pat. No. 5,329,222 is that a transformer is required to supply electrical energy to compensate for a voltage dip in the network voltage of the electrical AC supply network and, owing to its high stray inductance, this transformer requires a correspondingly large amount of space, involves intensive installation, and thus results in considerable costs, in particular material costs. Furthermore, the energy-storage capacitor which is used as an energy store is, according to U.S. Pat. No. 5,329,222 in the form of a capacitor bank in order to allow a sufficiently large capacitance to be achieved. An energy-storage capacitor provided in such a way thus causes additional costs owing to its considerable space requirement and its installation and busbar construction.

SUMMARY OF THE INVENTION

The object of the invention is therefore to specify a converter circuit for voltage maintenance in an electrical AC supply network, which has a particularly simple and cost-effective design, so that the installation and material costs of the converter circuit are minimized.

In the converter circuit according to the invention for voltage maintenance in an electrical AC supply network, an inverter is provided for each phase of the network, and is connected on the DC side via an energy-storage capacitor to a supply device. According to the invention, each inverter is connected on the AC side in series with the respective phase between a voltage source associated with that respective phase and an electrical load which is supplied from the voltage sources. This particularly advantageously means that there is no need for any transformer, connected on the AC side to the inverter, for supplying the respective phase, as a result of which the converter circuit is very simple, does not require intensive maintenance, and is thus cost-effective.

Furthermore, according to the invention, the supply device is connected on the AC side to at least two of the phases between the associated voltage sources and the respective inverters. In consequence, it is possible to select an energy-storage capacitor having a low capacitance, since the supply device which is connected to the phases can also draw electrical energy from the voltage sources for lengthy time periods in order to supply the energy-storage capacitor. This makes it possible to ensure in a particularly simple manner that even a lengthy reduction in the network voltage of the electrical AC supply network will be compensated for by the converter circuit according to the invention. Furthermore, the small size of the capacitance of the energy-storage capacitor which is now possible results in an advantageous reduction in the physical size, and thus in the material and busbar complexity.

In one preferred exemplary embodiment of the converter circuit according to the invention, the supply device in a polyphase AC supply network is connected on the AC side to each of the phases between the associated voltage sources and the respective inverters. This also makes it possible for the phases to be utilized in a balanced manner in the event of a reduction in the network voltage in one of the phases or in a number of phases, by drawing electrical energy for the supply device from those phases which are not affected by the voltage dip. Furthermore, this measure advantageously makes it possible to supply the electrical load in a very largely stable and balanced manner, even if the reductions in the network voltage are not balanced between the phases.

BRIEF DESCRIPTION OF THE DRAWINGS

Those and further objects, advantages and features of the present invention will become clear from the following detailed description of a preferred exemplary embodiment of the invention in conjunction with the drawing, in which.

Figure 1:
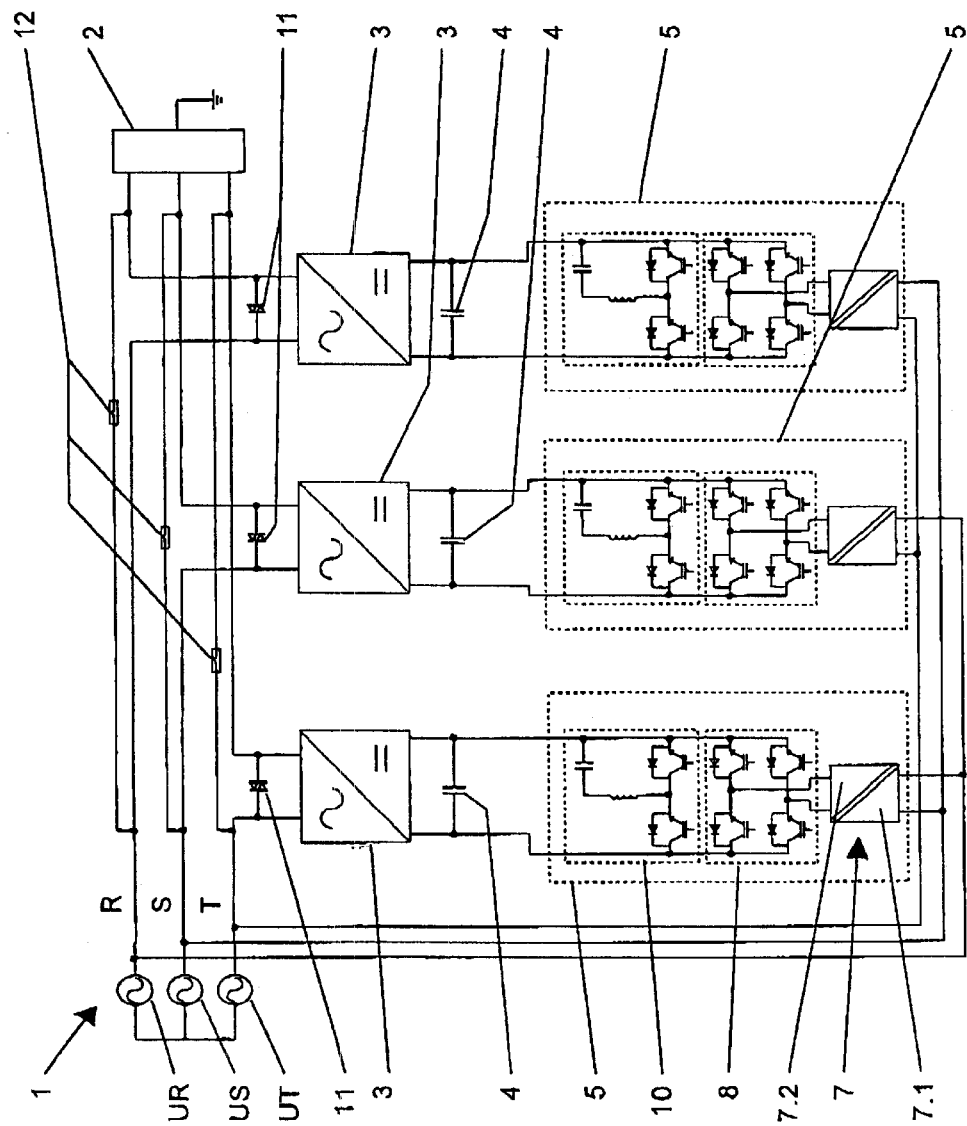
FIG. 1 shows one embodiment of a converter circuit according to the invention.

The reference symbols used in the drawing, and their meanings, are listed in summarized form in the list of reference symbols. In principle, identical parts are provided with the same reference symbols in the figures. The described embodiment represents an example of the subject matter of the invention and has no limiting effect.

DETAILED DESCRIPTION OF THE INVENTION

FIG. 1 shows one embodiment of a converter circuit according to the invention, which is used for voltage maintenance in an electrical AC supply network 1. The electrical AC supply network 1 in each case has an associated voltage source UR, US, UT for each of its phases R, S, T, and these voltage sources are intended for supplying an electrical load 2 which is connected to said voltage sources UR, US, UT. The electrical AC network 1 is, in particular, in the form of a three-phase network, as shown in FIG. 1. According to FIG. 1, an inverter 3 is in each case provided for each of the phases R, S, T. Each inverter 3 is connected on the DC side via an energy-storage capacitor 4 to a supply device 5, which is used for supplying the energy-storage capacitor 4. The inverter 3 is designed as a single-phase, single-stage bridge circuit or as a single-phase, two-stage bridge circuit with controllable power semiconductor switches, although these items are not shown for the sake of clarity.

According to the invention, the inverter 3 shown in FIG. 1 is connected with its AC side in series in the respective phase R, S, T of the electrical AC supply network 1 between the associated voltage source UR, US, UT and the electrical load 2. This measure advantageously avoids the need for a transformer, as is known from the prior art and which is connected on the AC side to the inverter 3, for supplying the respective phase R, S, T, thus resulting in a converter circuit design which is simple, does not require intensive maintenance, and is thus cost-effective.

Furthermore, the supply device 5 shown in FIG. 1 is, according to the invention, connected on its AC side to at least two of the phases R, S, T between the associated voltage sources UR, US, UT and the respective inverters 3. There is thus no need for any large energy-storage capacitor 4 with a high capacitance. It is thus possible to use an energy-storage capacitor 4 that has been selected as having a low capacitance which, even in the event of lengthy reductions in the network voltage of the electrical AC supply network 1, is supplied sufficiently from the supply device 5. This supply to the energy-storage capacitor 4 advantageously always results in there being sufficient electrical energy in the energy-storage capacitor 4 for the inverter 3 to provide adequate compensation for the voltage dip which has occurred in the network voltage by supplying electrical energy into the corresponding phase R, S, T, even over a lengthy time period. Furthermore, the energy-storage capacitor 4, which is chosen to have a low capacitance, advantageously results in a reduction in the physical size and, associated with this, reduced material and busbar complexity.

Each supply device 5 in the converter circuit shown in FIG. 1 in an electrical polyphase AC supply network 1 according to the invention is connected to a second phase R, S, T and to a third phase R, S, T, with the inverter 3 being connected to a first phase R, S, T. The supply device 5 can thus advantageously draw electrical energy, in the event of a voltage dip occurring in the phase R, S, T of the connected inverter 3, from the two other phases R, S, T which are not affected by the voltage dip, so that the voltage dip in the relevant phase R, S, T can be compensated for particularly effectively.

According to FIG. 1, the supply device 5 has a single-phase transformer 7, whose primary 7.1 is connected to the second phase R, S, T and to the third phase R, S, T between the associated voltage sources UR, US, UT and the respective inverters 3. The single-phase transformer 7 is in this case used for DC isolation of the converter circuit, in particular of the supply device 5, from the connected phases R, S, T. Furthermore, the supply device 5 has a single-phase rectifier circuit 8 which is connected to a secondary 7.2 of the single-phase transformer 7. The single-phase rectifier circuit 8 is used for rectification of the AC voltage on the secondary 7.2 of the single-phase transformer 7, and is connected on the DC side to the energy-storage capacitor 4. It has been found to be advantageous for the single-phase rectifier circuit 8 to be in the form of a single-phase, single-stage bridge circuit or a single-phase, two-stage bridge circuit, so that it is possible to achieve a simple design with little component complexity. By way of example, FIG. 1 shows a single-phase rectifier circuit a in the form of a single-phase, single-stage bridge circuit. Furthermore, the supply device 5 shown in FIG. 1 has an energy-storage unit 10 which is connected on the DC side in parallel with the single-phase rectifier circuit 8 and is connected to the energy-storage capacitor 4. The energy-storage unit 10 is formed by an electrical energy-storage element, preferably by an inductance and a capacitor, and by two series-connected controllable power semiconductor switches, each having a diode connected back-to-back in parallel with each power semiconductor switch. The energy-storage element is advantageously used for voltage matching for the voltage applied to the energy-storage capacitor 4. This energy-storage unit 10 also allows electrical energy to be stored which is drawn via the single-phase transformer 7 and the single-phase rectifier circuit 8 from the corresponding phases R, S, T and, if required, can advantageously also be used for supplying the energy-storage capacitor 4.

In one embodiment of the converter circuit, which is not illustrated for the sake of clarity, in the case of a single-phase electrical AC supply network 1 such as that which is used for an electrical railroad network, for example, the inverter 3 is connected, according to the invention, to the first phase R, S, and the supply device 5 is connected to the first phase R, S and to the second phase R, S between the associated voltage sources UR, US and the respective inverters 3. This results in the already mentioned advantages of the converter circuit with a single-phase AC supply network 1 as well.

Figure 3:
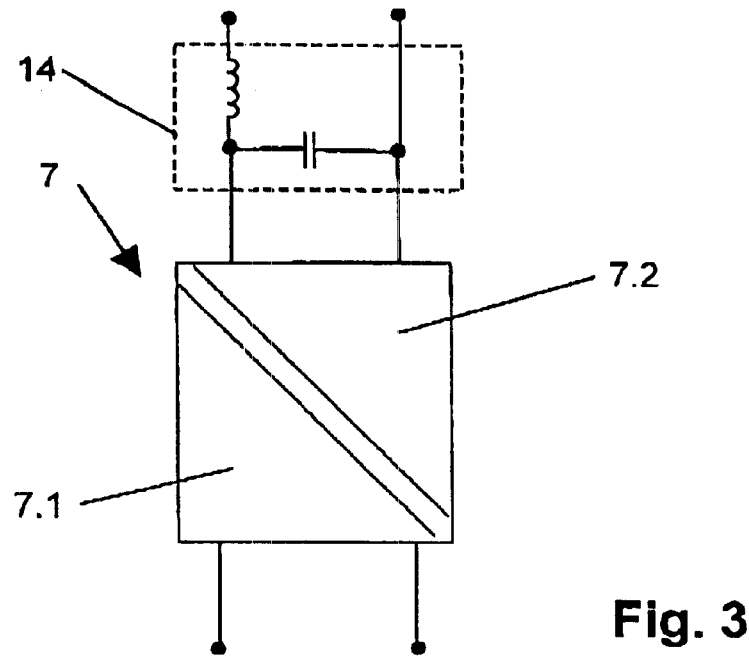
FIG. 3 shows a partial detail of the converter circuit according to the invention, as shown in FIG. 1, with an additional single-phase harmonic filter circuit.

FIG. 3 shows a partial detail of the converter circuit according to the invention shown in FIG. 1 with an additional single-phase harmonic filter circuit 14. The single-phase harmonic filter circuit 14 is connected in parallel with the secondary 7.2 of the single-phase transformer 7, and is connected to the single-phase rectifier circuit 8. According to FIG. 3, the single-phase harmonic filter circuit 14 is connected to the single-phase rectifier circuit 8 on the AC side of the single-phase rectifier circuit 8. The single-phase harmonic filter circuit 14 advantageously comprises a tuned circuit which is tuned to a harmonic frequency, so that any harmonics in the corresponding phases R, S, T can be kept away from the load 7, and away from the voltage sources UR, US, UT and thus away from the AC supply network 1, as well, by means of the filtering effect of the single-phase harmonic filter circuit 14.

Figure 2:
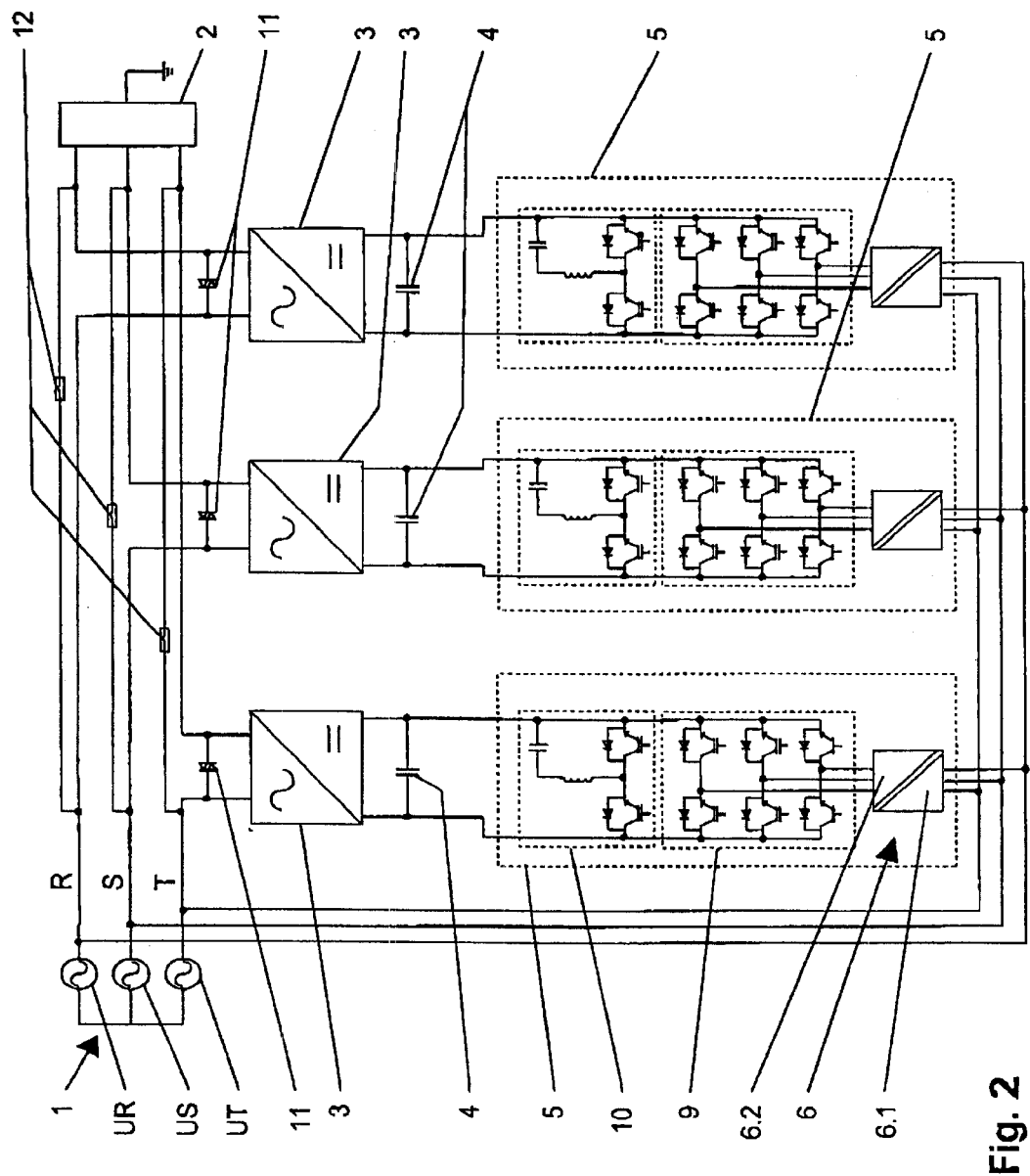
FIG. 2 shows a further embodiment of a converter circuit according to the invention.

FIG. 2 shows a further embodiment of a converter circuit according to the invention. In contrast to the embodiment of the converter circuit according to the invention illustrated in FIG. 1, in the converter circuit shown in FIG. 2 and in the case of a polyphase electrical AC supply network, the supply device 5 is connected on its AC side to each of the phases R, S, T between the associated voltage sources UR, US, UT and the respective inverters 3, that is to say it is connected to the first phase R, S, T, to the second phase R, S, T and to the third phase R, S, T. According to FIG. 2, the inverter is connected to the first phase R, S, T. Thus, in addition to the advantages already mentioned with regard to the embodiment of the converter circuit according to the invention shown in FIG. 1, this allows balanced loading of the phases R. S, T in the event of a reduction in the network voltage in one of the phases R, S, T or in a number of phases X, S T., by drawing electrical energy for the supply device 5 from those phases R, S, T which are not affected by the voltage dip.

According to FIG. 2, the supply device 5 according to the invention has a polyphase transformer 6 which, in particular, is designed with three phases. The polyphase transformer 6 is connected by its primary 6.1 to each of the phases R, S, T between the associated voltage sources UR, US, UT and the respective inverters 3, that is to say to the first phase R, S, T, to the second phase R, S, T, and to the third phase R, S, T. The polyphase transformer 6 is in this case used for DC isolation of the converter circuit, in particular of the supply device 5, from the connected phases R, S, T. The supply device 5 furthermore comprises a three-phase rectifier circuit 9 which is connected to a secondary 6.2 of the polyphase transformer 6. The three-phase rectifier circuit 9 is used for rectification of the AC voltage on the secondary 6.2 of the polyphase transformer 6, and is connected on the DC side to the energy-storage capacitor 4. It has been found to be advantageous for the three-phase rectifier circuit 9 to be in the form of a three-phase, single-stage bridge circuit or a three-phase, two-stage bridge circuit, so that a simple design can be achieved with few components. By way of example, FIG. 2 shows a three-phase rectifier circuit 9 as a three-phase, single-stage bridge circuit. Furthermore, the supply device 5 shown in FIG. 3 has an energy-storage unit 10 which is connected on the DC side in parallel with the three-phase rectifier circuit 8, is connected to the energy-storage capacitor 4 and, in terms of its design, corresponds to the already described energy-storage unit 10 as shown in FIG. 1. It is thus likewise possible for the energy-storage unit 10 shown in FIG. 2 to store electrical energy, which is drawn from the phases R, S, T via the polyphase transformer 6 and the three-phase rectifier circuit 9, and advantageously to use it in addition, when required, to supply the energy-storage capacitor 4.

Figure 4:
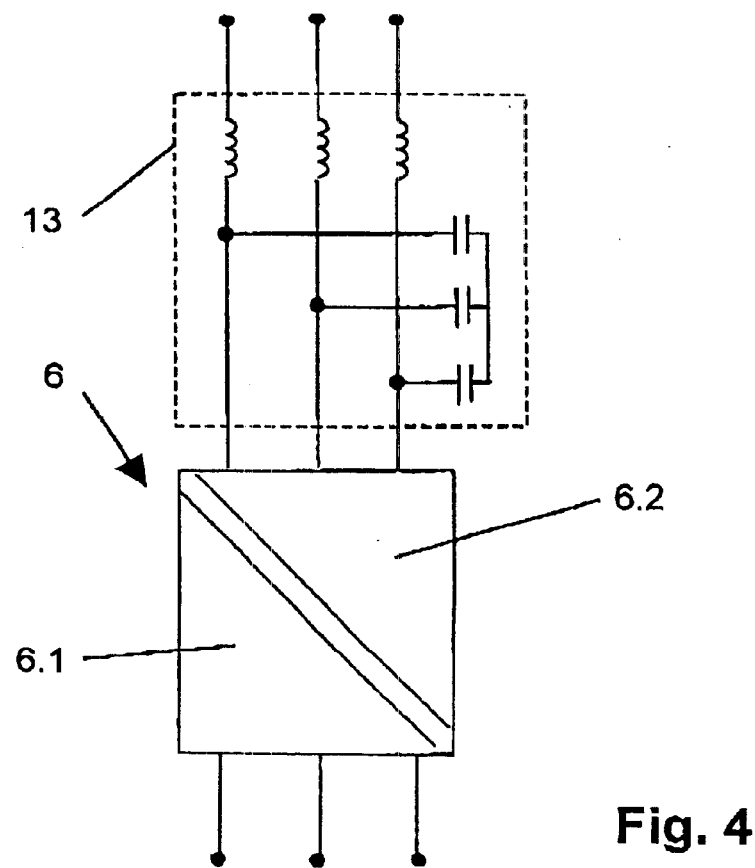
FIG. 4 shows a partial detail of the converter circuit according to the invention, as shown in FIG. 2 with an additional three-phase harmonic filter circuit.

FIG. 4 shows a partial detail of the converter circuit according to the invention shown in FIG. 2 with an additional three-phase harmonic filter circuit 13. The three-phase harmonic filter circuit 13 is connected in parallel with the secondary 6.2 of the polyphase transformer 6, and is connected to the three-phase rectifier circuit 9. According to FIG. 4, the three-phase harmonic filter circuit 13 is connected to the three-phase rectifier circuit 9 on the AC side of the three-phase rectifier circuit 9. The three-phase harmonic filter circuit 13 advantageously comprises a tuned circuit which is tuned to a harmonic frequency, so that any harmonics in the corresponding phases can be kept away from the load 2 and also away from the voltage sources UR, US, UT, and thus away from the AC supply network 1, by the filtering effect of the three-phase harmonic filter circuit 13.

Furthermore, according to FIG. 1 and FIG. 2, a controllable power semiconductor isolating switch 11 is provided according to the invention, and is connected in parallel with the AC side of the inverter 3. The controllable power semiconductor isolating switch 11 is used for rapid disconnection of the inverter 3 from the phase R, S, T to which the inverter 3 is connected if a malfunction of the inverter 3 or a load short-circuit occurs. Such disconnection is carried out by closing the power semiconductor isolating switch 11 so that the inverter 3 is bridged, with the disconnection preferably taking place in a time period of 5 $\mu$s to 10 $\mu$s. The power semiconductor isolating switch 11 is advantageously in the form of a thyristor, in particular an integrated thyristor with a commutator gate electrode (IGCT) so that the disconnection time range quoted above can thus be achieved.

Furthermore, according to FIG. 1 and FIG. 2, a switch disconnector 12 is provided according to the invention for each phase R, S, T, and is connected in parallel with each inverter 3 connected in the respective phase R, S, T. The switch disconnector 12 is preferably in the form of a mechanical circuit breaker or an electronic power switch, in particular a power semiconductor switch. If a fault occurs in the corresponding phase R, S, T and/or the respective inverter 3 malfunctions, as already mentioned above, the switch disconnector 12 is closed, thus forming a bypass for the corresponding inverter 3, and the inverter 3 being bridged.

Overall, the converter circuit according to the invention represents a particularly simple efficient and cost-effective solution for compensating for a reduction in the network voltage in one of the phases R, S, T or in a number of phases R, S, T of the electrical AC supply network 1. In addition, the converter circuit according to the invention makes it possible, to influence the network voltage in one or more phases R, S, T when an overvoltage occurs in one or more of these phases R, S, T. In this case, the inverter 3 supplies electrical energy from the relevant phase or phases R, S, T to the energy-storage capacitor 4, so that the overvoltage in the network voltage can be advantageously reduced. This influencing of an overvoltage in the network voltage is also feasible over a lengthy time period, since excess electrical energy can be dissipated via the single-phase rectifier circuit 8 or via the three-phase rectifier circuit 9. Furthermore, the converter circuit allows the network voltage to be regulated, in particular if the network voltage is intended to be raised or lowered. In addition, the converter circuit can advantageously be used as a phase shifter in order to allow any power factor correction which may be required for the electrical AC supply network 1 to be carried out to ensure that the electrical AC supply network 1 operates in a specific, desired manner. If any harmonics occur in the AC supply network 1, in particular harmonics which are generated by the load 2, it is also possible to use the converter circuit to compensate for these harmonics. Furthermore, if a load short-circuit occurs, the short-circuit current associated with this can be limited by means of the converter circuit by deliberately supplying a voltage which is in antiphase.

LIST OF REFERENCE SYMBOLS

1 AC supply network
2 Electrical load
3 Inverter
4 Energy-storage capacitor
5 Supply device
6 Polyphase transformer
6.1 Primary of the polyphase transformer
6.2 Secondary of the polyphase transformer
7 Single-phase transformer
7.1 Primary of the single-phase transformer
7.2 Secondary of the single-phase transformer
8 Single-phase rectifier circuit
9 Three-phase rectifier circuit
10 Energy-storage unit
11 Power semiconductor isolating switch
12 Switch disconnector
13 Three-phase harmonic filter circuit
14 Single-phase harmonic filter circuit UR, US
UT Voltage sources

What is claimed is:

1. A converter circuit for voltage maintenance in an electrical AC supply network, with the electrical AC supply network having an associated voltage source for each phase for supplying an electrical load, with the converter circuit having a respective inverter for each phase, which inverter is connected on the DC side via an energy-storage capacitor to a supply device, wherein, on the AC side, each inverter is connected in series between the associated voltage source and the electrical load in the respective phase, and wherein, on the AC side, the supply device is connected to at least two phases between the associated voltage sources and the respective inverters.

2. The converter circuit as claimed in claim 1, wherein, in a single-phase electrical AC supply network, the inverter is connected to a first phase and the supply device is connected to the first phase and to a second phase.

3. The converter circuit as claimed in claim 1, wherein, in the case of a polyphase electrical AC supply network, the inverter is connected to a first phase and the supply device is connected to a second phase and to a third phase.

4. The converter circuit as claimed in claim 1, wherein, in the case of a polyphase electrical AC supply network, the inverter is connected to a first phase, and the supply device is connected to the first phase, to a second phase and to a third phase.

5. The converter circuit as claimed in claim 4, wherein the supply device has a polyphase transformer whose primary is connected to the first phase, to the second phase and to the third phase between the associated voltage sources and the respective inverters.

6. The converter circuit as claimed in claim 3, wherein the supply device has a single-phase transformer whose primary is connected to the second phase and to the third phase between the associated voltage sources and the respective inverters.

7. The converter circuit as claimed in claim 5, wherein the supply device has a three-phase rectifier circuit which is connected to a secondary of the polyphase transformer and is connected on the DC side to the energy-storage capacitor.

8. The converter circuit as claimed in claim 6, wherein the supply device has a single-phase rectifier circuit which is connected to a secondary of the single-phase transformer and is connected on the DC side to the energy-storage capacitor.

9. The converter circuit as claimed in claim 7, wherein a three-phase harmonic filter circuit is provided, which is connected in parallel with the secondary of the polyphase transformer, is connected to the three-phase rectifier circuit, and has a tuned circuit which is tuned to a harmonic frequency.

10. The converter circuit as claimed in claim 8, wherein a single-phase harmonic filter circuit is provided, which is connected in parallel with the secondary of the single-phase transformer, is connected to the single-phase rectifier circuit, and has a tuned circuit which is tuned to a harmonic frequency.

11. The converter circuit as claimed in claim 7, wherein the supply device has an energy-storage unit which is connected on the DC side in parallel with the rectifier circuit and is connected to the energy-storage capacitor.

12. The converter circuit as claimed in claim 1, wherein a controllable power semiconductor isolating switch is connected in parallel with the AC side of the inverter.

13. The converter circuit as claimed in claim 1, wherein a switch disconnector is provided for each phase, and is connected in parallel with each inverter connected in the respective phase.

* * * * *